United States Patent
Koo et al.

(10) Patent No.: US 9,791,987 B2
(45) Date of Patent: Oct. 17, 2017

(54) TOUCH SCREEN PANEL

(71) Applicant: SAMSUNG DISPLAY CO., LTD., Yongin-si, Gyeonggi-Do (KR)

(72) Inventors: So Young Koo, Yongin-si (KR); Jong Chan Lee, Suwon-si (KR); Yoon Ho Khang, Yongin-si (KR); Sun Haeng Cho, Hwaseong-si (KR)

(73) Assignee: Samsung Display Co., Ltd., Yongin-Si, Gyeonggi-do (KR)

( * ) Notice: Subject to any disclaimer, the term of this patent is extended or adjusted under 35 U.S.C. 154(b) by 85 days.

(21) Appl. No.: 14/833,358

(22) Filed: Aug. 24, 2015

(65) Prior Publication Data

US 2016/0224165 A1 Aug. 4, 2016

(30) Foreign Application Priority Data

Feb. 2, 2015 (KR) ........................ 10-2015-0016357

(51) Int. Cl.
*G06F 3/041* (2006.01)
*G06F 3/044* (2006.01)

(52) U.S. Cl.
CPC .............. *G06F 3/044* (2013.01); *G06F 3/041* (2013.01); *G06F 3/0412* (2013.01); *G06F 2203/04103* (2013.01)

(58) Field of Classification Search
CPC combination set(s) only.
See application file for complete search history.

(56) References Cited

U.S. PATENT DOCUMENTS

| | | | | |
|---|---|---|---|---|
| 2006/0001819 A1* | 1/2006 | Maeng | ............... | G02F 1/1345 349/149 |
| 2012/0247938 A1* | 10/2012 | Saito | ............... | G06F 3/044 200/600 |
| 2013/0278513 A1* | 10/2013 | Jang | ............... | G06F 3/044 345/173 |
| 2014/0042394 A1* | 2/2014 | Lee | ............... | H01L 51/5203 257/40 |
| 2014/0043288 A1* | 2/2014 | Kurasawa | ............. | G06F 3/0412 345/174 |
| 2014/0232691 A1* | 8/2014 | Lee | ............... | G06F 3/044 345/174 |
| 2014/0346028 A1* | 11/2014 | Lin | ............... | H03K 17/9622 200/600 |
| 2016/0070406 A1* | 3/2016 | Han | ............... | G06F 3/044 345/173 |

FOREIGN PATENT DOCUMENTS

| | | |
|---|---|---|
| JP | 2013-117816 A | 6/2013 |
| KR | 10-1119269 B1 | 3/2012 |
| KR | 10-2014-0013482 A | 2/2014 |
| KR | 10-1369881 B1 | 3/2014 |

* cited by examiner

*Primary Examiner* — Jennifer Mehmood
*Assistant Examiner* — Sosina Abebe
(74) *Attorney, Agent, or Firm* — Lee & Morse, P.C.

(57) ABSTRACT

A touch screen panel includes a substrate, a plurality of touch electrodes in a touch area of the substrate, the touch electrodes sensing a touch, a connection line connected to a touch electrode of the plurality of touch electrodes, and a pad connected to one end of the connection line. The pad includes a first pad, a second pad on the first pad within a boundary line of the first pad, and a third pad covering a top surface and a side surface of the second pad.

9 Claims, 7 Drawing Sheets

ID PANEL

CROSS-REFERENCE TO RELATED APPLICATION

Korean Patent Application No. 10-2015-0016357, filed on Feb. 2, 2015, in the Korean Intellectual Property Office, and entitled: "Touch Screen Panel," is incorporated by reference herein in its entirety.

BACKGROUND

1. Field

Embodiments relate to a touch screen panel, and more particularly, to a touch screen panel including a capacitive type touch sensor.

2. Description of the Related Art

Display devices such as a liquid crystal display (LCD), an organic light emitting display (OLED), or the like, portable transmitter, other information processing devices, or the like perform functions thereof using various input devices. Recently, as the above-mentioned input devices, an input device including a touch sensing device has been used.

The touch sensing function refers to a function detecting touch information, such as whether or not an object approaches or touches a screen, and a touch location of the object. The touch sensing device may detect the touch information by sensing a change in pressure, charge, or light applied to a screen thereof, for example, when a user approaches or touches the screen with a finger or a touch pen so as to write letter or make a picture on the screen, etc. The display device may receive an image signal and display an image based on the touch information.

SUMMARY

Embodiments are directed to a touch screen panel including a substrate, a plurality of touch electrodes in a touch area of the substrate, the touch electrodes sensing a touch, a connection line connected to a touch electrode of the plurality of touch electrodes, and a pad connected to one end of the connection line. The pad includes a first pad, a second pad on the first pad within a boundary line of the first pad, and a third pad covering a top surface and a side surface of the second pad.

The third pad may be in contact with a top surface of the first pad outside of a boundary line of the second pad.

The first pad and the third pad may be made of a transparent conductive material.

The second pad may be made of copper.

The pad may further include a fourth pad on the substrate, the fourth pad overlapping the first pad.

The fourth pad may include a metal nanowire.

The touch electrodes may include a first electrode made of a transparent conductive material and a second electrode made of the transparent conductive material, the second electrode being on the first electrode.

The touch electrodes may further include a third electrode on the substrate, the third electrode overlapping the first electrode.

The third electrode may include a metal nanowire.

The touch electrodes may be in rows and columns. The touch screen panel may include a plurality of connection lines and a plurality of pads, each pad being connected to one end of a respective one of the connection lines. A size of the touch electrodes may decrease according to a proximity to the pads.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
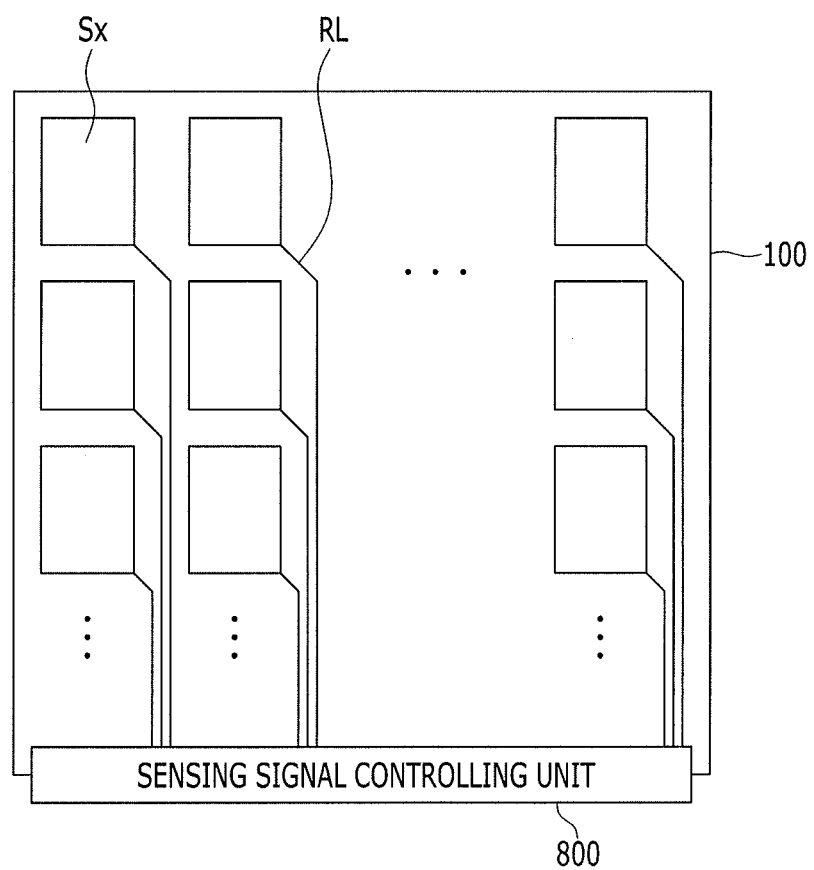
FIG. 1 illustrates a schematic plan view of a touch screen panel according to an exemplary embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "between" two layers, it can be the only layer between the two layers, or one or more intervening layers may also be present. Like reference numerals refer to like elements throughout.

FIG. 1 illustrates a schematic plan view of a touch screen panel according to an exemplary embodiment.

As shown in FIG. 1, a touch screen panel according to an exemplary embodiment may include a touch sensor and a sensing signal controlling unit 800 connected to the touch sensor.

The touch sensor according to an exemplary embodiment is a touch sensor capable of sensing a touch of an external object. The touch sensor may be various types of touch sensors. A capacitive type touch sensor will be described in the present exemplary embodiment by way of example.

The touch sensor may be included in a display panel or may be a separate touch panel, so as to sense the touch. An example in which the touch sensor is included in the touch panel will be mainly described in the present exemplary embodiment. The touch may include instances in which the external object approaches the display panel or the touch panel, as well as instances in which the external object is directly in contact with the display panel or the touch panel.

The touch sensor according to an exemplary embodiment may include a plurality of touch electrodes Sx disposed on an active area of a substrate 100 and a plurality of connection lines RL connected to the touch electrodes Sx. The active area, which is an area to which the touch may be applied and from which the touch may be sensed, may be overlapped with a display area on which an image is displayed, for example. In a touch panel, the active area may be a touch area, and when the touch panel is embedded in the display panel, the touch area may be overlapped with the display area. Hereinafter, the active area is also referred to as the touch area.

The plurality of touch electrodes Sx may be arranged in a form of rows and columns may be formed on the same layer as each other in a cross-sectional view. The touch electrode Sx may include a transparent conductive material such as indium tin oxide (ITO) and indium zinc oxide (IZO), and a metal nanowire, as examples. The metal nanowire may be a silver (Ag) nanowire.

The touch electrode Sx may have a suitable shape. For example, the touch electrode Sx may have a quadrangular shape, as shown in FIG. 1. The touch electrode Sx may include a plurality of protrusions and depressions formed at edge sides in order to increase touch sensitivity. When the edge side of the touch electrode Sx includes the plurality of protrusions and depressions, the protrusion and depression type side edges of touch electrodes Sx that are adjacent to each other may be engaged with each other.

A length of one side of the touch electrode Sx may be approximately several mm, for example, approximately 10 mm or less, or, for example, may be approximately 4 mm to 5 mm, but a size of the touch electrode Sx may be properly adjusted depending on touch sensing resolution.

The plurality of touch electrodes Sx may be separated from each other in the touch area. The touch electrodes Sx different from each other may be connected to the sensing signal controlling unit 800 through connection lines RL different from each other.

The touch electrodes Sx according to the present exemplary embodiment may receive a sensing input signal from the sensing signal controlling unit 800 through the respective connection lines RL, and may generate a sensing output signal according to the touch so as to be transmitted to the sensing signal controlling unit 800. Each touch electrode Sx may form a self sensing capacitor so as to be charged with a predetermined charge amount after receiving the sensing input signal. Thereafter, when an external object such as a finger touches the touch panel, the charge amount charged in the self sensing capacitor may be changed, such that a sensing output signal different from the received sensing input signal may be output. Touch information such as whether or not the object touches the touch panel and a touch position may be detected by the sensing output signal generated as described above.

The connection lines RL may connect the touch electrodes Sx and the sensing signal controlling unit 800, so as to transmit the sensing input signal or the sensing output signal. The connection line RL may be disposed on the same layer as the touch electrode Sx and may be made of the same material as the touch electrode Sx. In other implementations, the connection line RL may be disposed on a layer different from the touch electrode Sx and may be connected to the touch electrode Sx through a separate connection part.

In the exemplary embodiment shown in FIG. 1, the number of connection lines RL disposed between columns of the touch electrodes Sx may increase relative to a proximity to the sensing signal controlling unit 800. In addition, the closer the sensing signal controlling unit 800, the smaller the size of the touch electrode Sx may decrease relative to the proximity to the sensing control unit.

A width of the connection line RL may be in a range of about 10 μm to about 100 μm. A connection portion between the touch electrode Sx and the connection line RL may form a bottle neck portion where a width is sharply increased or decreased.

The sensing signal controlling unit 800 may be connected to the touch electrodes Sx of the touch panel so as to transmit the sensing input signal to the touch electrodes Sx and receive the sensing output signal from the touch electrodes Sx. By processing the sensing output signal, the sensing signal controlling unit 800 may generate the touch information such as, for example, whether an object touches the touch panel and the touch position.

The sensing signal controlling unit 800 may be disposed on a printed circuit board independent of the touch panel so as to be connected to the touch panel. The sensing signal controlling unit 800 may be attached onto the touch panel as an integrated circuit chip or an a TCP form, or may be integrated on the substrate 100.

Hereinafter, an interlayer configuration of the touch screen panel according to an exemplary embodiment will be described in more detail.

Figure 2:
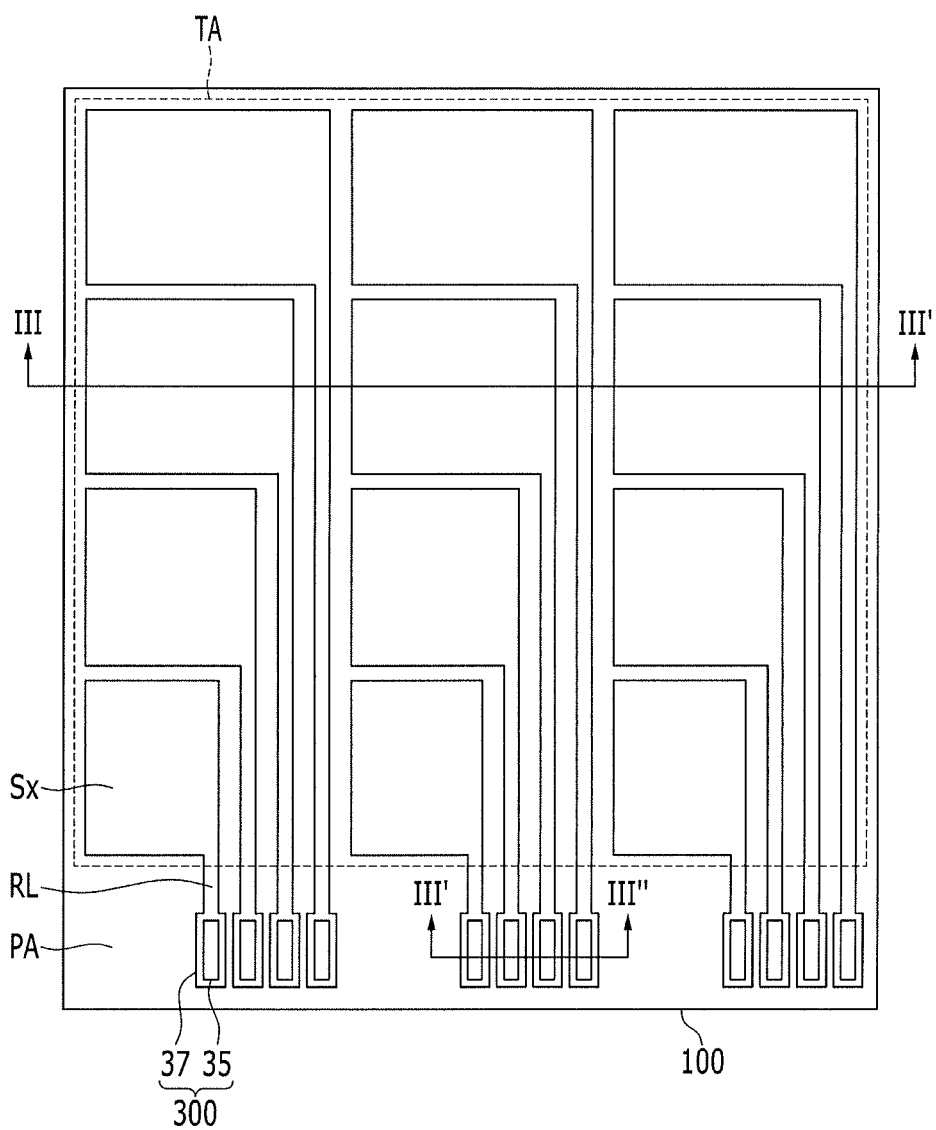
FIG. 2 illustrates a layout view of a touch electrode according to an exemplary embodiment.
Figure 3:
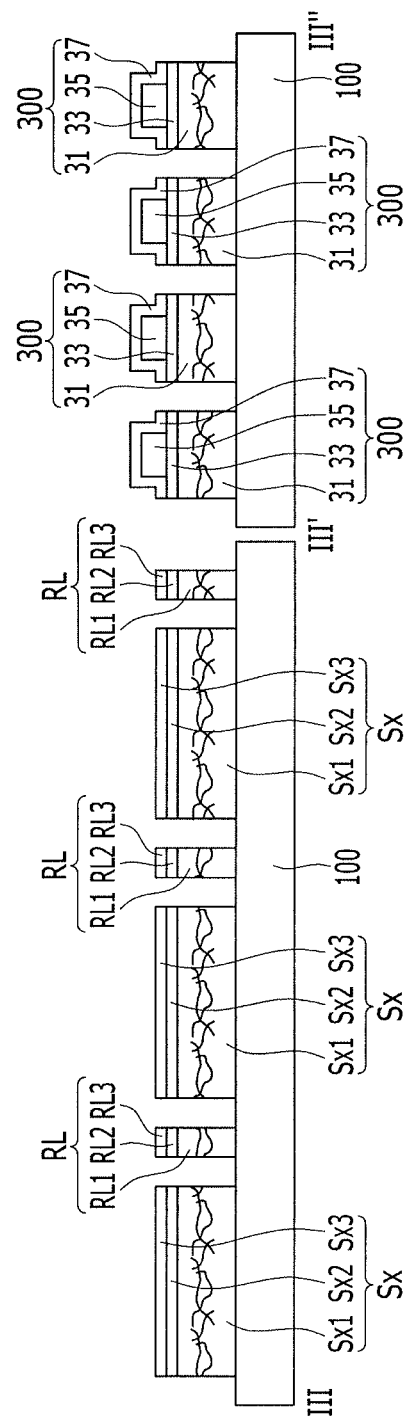
FIG. 3 illustrates a cross-sectional view taken along line III-III' and line III'-III" of FIG. 2.

FIG. 2 illustrates a layout view of a touch electrode according to an exemplary embodiment and FIG. 3 is a cross-sectional view taken along line III-III' and line III'-III" of FIG. 2.

As shown in FIGS. 2 and 3, a touch screen panel according to an exemplary embodiment may include a substrate 100 and a plurality of touch electrodes Sx formed on the substrate 100 and formed in rows and columns.

Referring to FIG. 2, the plurality of touch electrodes Sx may be disposed in one direction with a predetermined interval therebetween. The respective touch electrodes Sx may be connected to respective pads 300 through the connection lines RL. The connection lines RL may input an input signal to the touch electrodes Sx or output an output signal to the sensing signal controlling unit through the pads 300.

The connection lines RL may be primarily disposed in a touch area TA in which the touch electrodes Sx are formed, and each connection line may be connected to the pad 300 disposed in a peripheral area PA, outside of the touch area TA. The connection line RL may be connected to one side of the touch electrode Sx facing the pad 300 and may be disposed between two touch electrodes Sx that are adjacent to each other.

As such, if the connection line RL is disposed between the touch electrodes Sx, a width of the peripheral area in which the pads 300 are not formed may be further decreased.

An area of the touch electrodes Sx may decrease relative to a proximity to the pads 300. For example, touch electrodes Sx close to the pads may have a smaller area than touch electrodes farther away from the pads. The connection line is connected from one side of the touch electrode Sx to the pad 300 in a straight line without being curved. The width of the touch electrode Sx decreases in each successive row in a direction towards the pads 300 as much as a width of the connection line RL and an interval between the connection lines.

For example, if it is assumed that a row farthest from the pad 300 to a row closest to the pad 300 are defined as a first row to a fourth row in sequence, the touch electrode Sx of the first row farthest from the pad has the largest area and the touch electrode Sx of the fourth row closest to the pad has the smallest area. The reason is that each successive row between the first row and the fourth row adds an additional connection line between touch electrodes in the row. For example, all connection lines RL connected to the touch electrodes Sx of the first row, the second row, and the third row pass between the touch electrodes Sx disposed in the fourth row, such that the touch electrodes Sx disposed in the fourth row may have a narrower width.

The touch electrodes are shown in FIG. 2 as three columns and fourth rows, as an example. The touch electrodes may be disposed in a greater number of rows and columns, as desired.

The touch electrode Sx according to an exemplary embodiment may receive the sensing input signal through the connection line RL and then may be charged with a predetermined charge amount. Thereafter, when the external object such as a finger touches the touch panel, the charge amount charged in the self sensing capacitor may be changed, such that a sensing output signal different from the received input sensing input signal may be output. Touch information such as whether or not the object touches the touch panel and a touch position may be detected through a change in the sensing output signal, as described above.

The substrate 100 may include a plastic, such as polycarbonate, polyimide, polyether, and sulfone, or glass. The substrate 100 may be a transparent flexible substrate having flexibility, such as elasticity. For example, the substrate 100 may be foldable and bendable, rollable, and/or stretchable in at least one direction.

The plurality of touch electrodes Sx and a plurality of pads that are each connected to the touch electrodes Sx by the connection lines are formed on the substrate 100.

The touch electrode Sx may include a first electrode Sx1, a second electrode Sx2, and a third electrode Sx3 which are sequentially stacked. The connection line RL may include a first line RL1, a second line RL2, and a third line RL3 which are sequentially stacked.

The first electrode Sx1 and the first line RL1 may be formed of a metal nanowire. The metal nanowire may include a metal wire such as silver (Ag) and copper Cu. The metal nanowires may be connected to each other in a mesh shape, thereby forming a conductive electrode. The metal nanowire may be formed by a solution process such as a slit coating process, an inkjet printing process, or a spray process.

The first electrode Sx1 and the first line RL1 may further include a polymer resin that protects and fixes the metal nanowire. The polymer resin may include an acrylate based organic material such as acryl polyester resin. The polymer resin may be mixed with the metal nanowire so as to be applied with the forming of the first electrode Sx1 and the first line RL1, or may be applied to the metal nanowire after the metal nanowire layer is formed. The polymer resin may fill a space between the metal nanowires and may improve adhesion between the metal nanowire and the substrate 100.

The first electrode Sx1 and the first line RL1 may have high transmittance and surface resistance characteristics of a predetermined reference or less. Accordingly, the first electrode Sx1 and the first line RL1 may have high conductivity. In addition, the first electrode Sx1 and the first line RL1 may be more flexible than other metal thin films.

The second electrode Sx2 and the second line RL2 may be layers that supplement the conductivity of the first electrode Sx1 and the first line RL1. The second electrode Sx2 and the second line RL2 may have transmittance of a predetermined level or more, and may include a transparent conductive material that is dry-etchable. For example, the second electrode Sx2 and the second line RL2 may be indium tin oxide (ITO) and may have transmittance of about 85% or more for a visible ray region.

The third electrode Sx3 and the third line RL3 may be formed simultaneously with a layer that protects a third pad 35 to be described below. The third electrode Sx3 and the third line RL3 may be made of the same material as the second electrode Sx2 and the second line RL2.

The first electrode Sx1, the second electrode Sx2, and the third electrode Sx3 have the same plane shape, and the first line RL1, the second line RL2, and the third line RL3 have the same plane shape, according to a plan view.

The pad 300 may include a first pad 31, a second pad 33, a third pad 35, and a fourth pad 37, which are sequentially stacked. The first pad 31, the second pad 33, and the fourth pad 37 have the same plane shape, according to a plan view.

The third pad 35 may be disposed between the second pad 33 and the fourth pad 37. The third pad 35 may be formed so as to have a size smaller than that of the second pad 33, and a boundary line of the third pad 35 may be within a boundary line of the second pad 33.

The fourth pad 37 may be in contact with a top surface and a side surface of the third pad 35 and may be in contact with a top surface of the second pad 33 disposed out of the boundary of the third pad 35. For example, the fourth pad 37 may cover the third pad 35.

The first pad 31 may be made of the same material as the first electrode Sx1 and the first line RL1. For example, the first pad 31 may be made of the metal nanowire. The second pad 33 and the fourth pad 37 may be made of the same material as the second electrode Sx2, the second line RL2, the third electrode Sx3, and the third line RL3. For example, the second pad 33 and the fourth pad 37 may be made of ITO. The third pad 35 may be made of copper, which is a low resistance metal.

As such, by covering and protecting the third pad 35 using the fourth pad 37, it may be possible to prevent the third pad 35 from being exposed and corroded.

Hereinafter, a method for manufacturing a touch screen panel according to an exemplary embodiment will be described in more detail with reference to the accompanying drawings.

Figure 4:
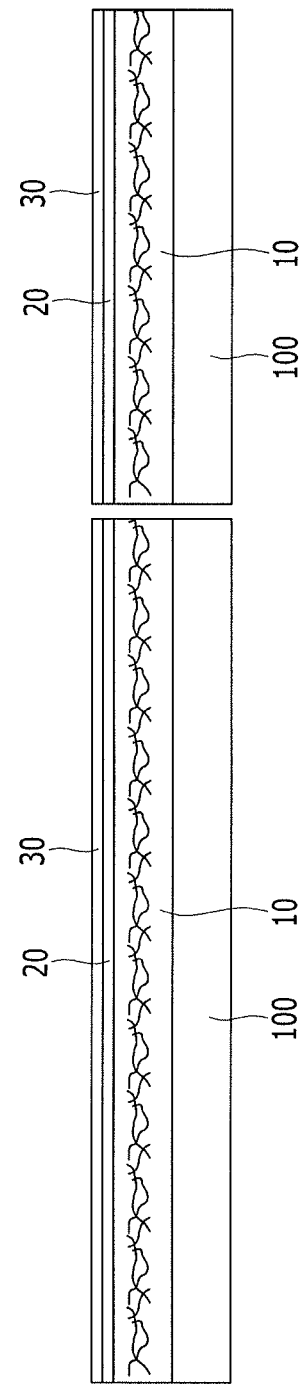
FIG. 4 illustrates a cross-sectional view depicting a stage of a method for manufacturing a touch screen panel according to an exemplary embodiment.
Figure 5:
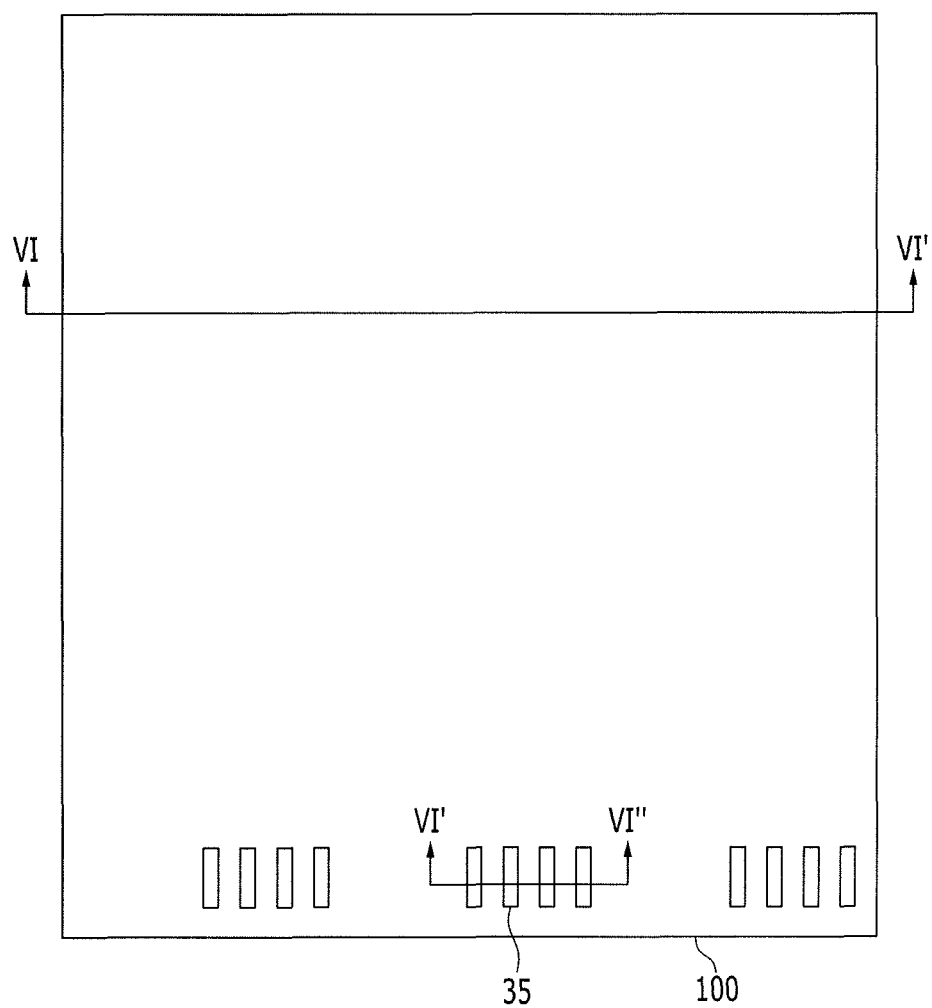
FIG. 5 illustrates a layout view depicting the method for manufacturing a touch screen panel in a next stage relative to FIG. 4.
Figure 6:
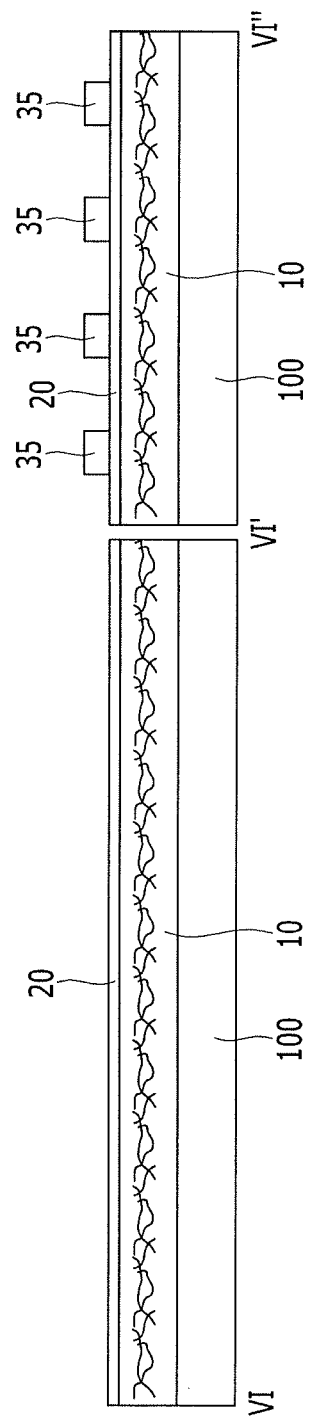
FIG. 6 illustrates a cross-sectional view taken along line VI-VI' and line VI'-VI" of FIG. 5.
Figure 7:
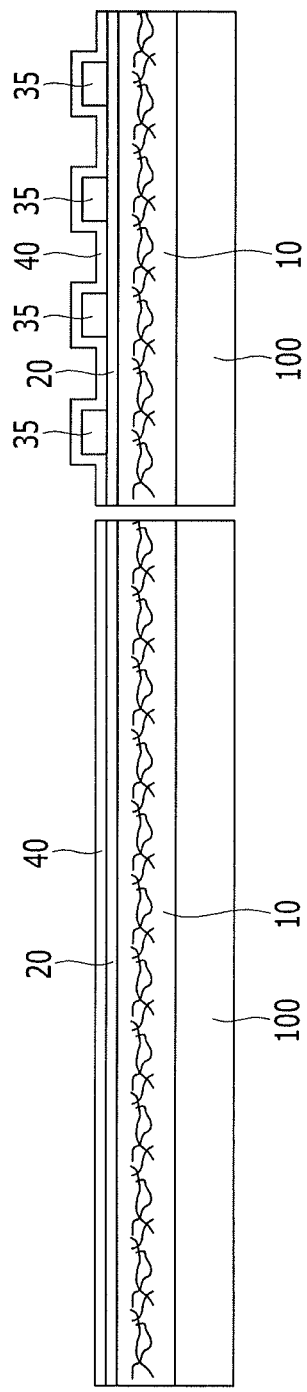
FIG. 7 illustrates a cross-sectional view depicting the method for manufacturing a touch screen panel in a next stage relative to FIG. 6.

FIG. 4 illustrates a cross-sectional view depicting a stage of a method for manufacturing a touch screen panel according to an exemplary embodiment, FIG. 5 illustrates a layout view depicting a method for manufacturing a touch screen panel in a stage subsequent to that illustrated in FIG. 4, FIG. 6 illustrates a cross-sectional view taken along line VI-VI' and line VI-VI" of FIG. 5, and FIG. 7 illustrates a cross-sectional view in a stage subsequent to that illustrated in FIG. 6.

As shown in FIG. 4, a first conductive layer 10, a second conductive layer 20, and a third conductive layer 30 may be formed on a substrate 100.

The first conductive layer 10 may include a silver nanowire. The silver nanowire may be applied together with a polymer resin by a solution process. In other implementations, the first conductive layer 10 may be formed of dry film resist including the silver nanowire.

The second conductive layer 20 may be formed by depositing ITO with a transparent conductive material. In addition, the third conductive layer 30 may be formed by depositing copper.

As shown in FIGS. 5 and 6, a third pad 35 made of copper may be formed by patterning the third conductive layer using a photolithography process, or the like.

As shown in FIG. 7, a fourth conductive layer 40 may be formed so as to cover the third pad 35. The fourth conductive layer 40 may be formed of the same material as the second conductive layer 20. For example, the fourth conductive layer 40 may be formed by depositing ITO.

As shown in FIGS. 2 and 3, a touch electrode Sx including a third electrode Sx3, a second electrode Sx2, and a first electrode Sx1, a connection line RL including a third line RL3, a second line RL2, and a first line RL1, and a pad 300 including a fourth pad 37, a third pad 35, a second pad 33, and a first pad 31 may be formed by patterning the fourth conductive layer 40, the second conductive layer 20, and the first conductive layer 10 using a photolithography process.

The fourth conductive layer, the second conductive layer, and the first conductive layer may be simultaneously etched. Accordingly, the third electrode, the second electrode, and the first electrode may have the same planar shape, the third line, the second line, and the first line may have the same line shape, and the first pad, the second pad, and the fourth pad may also have the same planar shape. In some implementations, the fourth conductive layer and the second conductive layer may be simultaneously etched after the first conductive layer is patterned, if desired.

By way of summation and review, a touch sensing function may be implemented by a touch sensor. The touch sensor may be classified depending on various touch sensing types such as a resistive type, a capacitive type, an electromagnetic resonance (EMR) type, or an optical type.

In a case of the resistive type touch sensor, two electrodes spaced apart from each other so as to face each other may be in contact with each other by pressure by an external object. When two electrodes are in contact with each other, the resistive type touch sensor may detect a touch position by recognizing a voltage change depending on a resistance change at the touch position.

The capacitive type touch sensor includes a sensing capacitor configured of touch electrodes capable of transmitting a sensing signal. The capacitive type touch sensor may sense a change in capacitance of the sensing capacitor generated when a conductor such as a finger approaches the sensor. Accordingly, the capacitive type touch sensor may detect whether the conductor touches the sensor, the touch location thereof, or the like. In the case of the capacitive type touch sensor, since touch may be sensed only when the user actually touches the touch screen, and touch with a conductive object is required.

The above-mentioned touch screen may be included in a flexible electronic device. However, due to flexible characteristics of the flexible electronic device, it is desirable for the electrodes of the touch screen to have flexibility so that a defect does not occur.

As materials of the electrode having flexibility, various materials such as a metal nanowire such as a silver nanowire (AgNW), a carbon nanotube, graphene, a metal mesh, and a conductive polymer have been developed. The above-mentioned materials have low conductivity. Accordingly, a separate pad formed of a low resistance metal such as copper is desirable to supplement conductivity for the pad of the touch screen.

However, if the pad to which an external signal is applied were to be exposed, the pad may be easily oxidized and corroded, and the oxidation and corrosion may spread into the whole touch sensor, which may cause a degradation in reliability of the screen.

Embodiments advance the art by providing a touch screen panel having advantages of preventing corrosion of a pad while using a low resistance metal. Example embodiments have been disclosed herein, and although specific terms are employed, they are used and are to be interpreted in a generic and descriptive sense only and not for purpose of limitation. Accordingly, it will be understood by those of skill in the art that various changes in form and details may be made without departing from the spirit and scope thereof as set forth in the following claims.

What is claimed is:

1. A touch screen panel, comprising:
   a substrate;
   a plurality of touch electrodes in a touch area of the substrate, the touch electrodes sensing a touch;
   a connection line connected to a touch electrode of the plurality of touch electrodes; and
   a pad connected to one end of the connection line,
   wherein:
      the pad includes a first pad, a second pad on the first pad within a boundary line of the first pad, and a third pad covering a top surface and a side surface of the second pad,
      the first pad and the third pad are made of a transparent conductive material,
      the first pad and the third pad have a same planar shape in a plan view, and
      the second pad has a lower resistance than the first pad and the third pad.

2. The touch screen panel as claimed in claim 1, wherein:
   the third pad is in contact with a top surface of the first pad outside of a boundary line of the second pad.

3. The touch screen panel as claimed in claim 2, wherein:
   the second pad includes copper.

4. The touch screen panel as claimed in claim 1, wherein:
   the pad further includes a fourth pad on the substrate, the fourth pad overlapping the first pad.

5. The touch screen panel as claimed in claim 4, wherein:
   the fourth pad includes a metal nanowire.

6. The touch screen panel as claimed in claim 1, wherein:
   the touch electrodes include a first electrode made of a transparent conductive material and a second electrode made of the transparent conductive material, the second electrode being on the first electrode.

7. The touch screen panel as claimed in claim 6, wherein:
   the touch electrodes further include a third electrode on the substrate, the third electrode overlapping the first electrode.

8. The touch screen panel as claimed in claim 7, wherein:
   the third electrode includes a metal nanowire.

9. The touch screen panel as claimed in claim 1, wherein:
   the touch electrodes are in rows and columns,
   the touch screen panel includes a plurality of connection lines and a plurality of pads, each pad being connected to one end of a respective one of the connection lines, and
   a size of the touch electrodes decreases according to a proximity to the pads.

* * * * *